US010423644B1

(12) United States Patent
Leach et al.

(10) Patent No.: US 10,423,644 B1
(45) Date of Patent: Sep. 24, 2019

(54) SPLITTING TRANSACTION AND ANALYSIS QUERIES

(71) Applicant: Splice Machine, Inc., San Francisco, CA (US)

(72) Inventors: John Leach, Saint Louis, MO (US); Daniel Gomez Ferro, Barcelona (ES); Monte Zweben, San Francisco, CA (US)

(73) Assignee: Splice Machine, Inc., San Francisco, CA (US)

( * ) Notice: Subject to any disclaimer, the term of this patent is extended or adjusted under 35 U.S.C. 154(b) by 350 days.

(21) Appl. No.: 15/349,973

(22) Filed: Nov. 11, 2016

Related U.S. Application Data

(60) Provisional application No. 62/255,957, filed on Nov. 16, 2015.

(51) Int. Cl.
| | | |
|---|---|---|
| *G06F 16/28* | (2019.01) | |
| *H04L 29/06* | (2006.01) | |
| *G06F 16/22* | (2019.01) | |
| *G06F 16/2453* | (2019.01) | |
| *G06F 16/2455* | (2019.01) | |
| *G06F 9/50* | (2006.01) | |

(52) U.S. Cl.
CPC ......... *G06F 16/283* (2019.01); *G06F 9/5083* (2013.01); *G06F 16/22* (2019.01); *G06F 16/24532* (2019.01); *G06F 16/24553* (2019.01); *G06F 16/24568* (2019.01); *H04L 63/00* (2013.01)

(58) Field of Classification Search
CPC ......... G06F 16/24542; G06F 16/24547; G06F 9/5083
See application file for complete search history.

(56) References Cited

U.S. PATENT DOCUMENTS

| | | | |
|---|---|---|---|
| 9,557,792 B1 * | 1/2017 | Potlapally | G06F 9/5094 |
| 2003/0212668 A1 * | 11/2003 | Hinshaw | G06F 16/2471 |
| 2008/0010240 A1 * | 1/2008 | Zait | G06F 16/24542 |
| 2009/0281987 A1 * | 11/2009 | Krishnamoorthy | G06F 16/2471 |
| 2013/0152057 A1 * | 6/2013 | Ke | G06F 8/453 717/132 |
| 2016/0110439 A1 * | 4/2016 | Hrle | G06F 16/273 707/600 |

OTHER PUBLICATIONS

Alonso et al, Energy Efficient Query Optimization, 1992, 19 pp. (Year: 1992).*

* cited by examiner

*Primary Examiner* — Marc S Somers
(74) *Attorney, Agent, or Firm* — Van Pelt, Yi & James LLP

(57) ABSTRACT

A system for analysis and transaction processing includes an interface and a processor. The interface is configured to receive a task. The processor is configured to determine a processing estimate associated with the task by determining required resources for a set of possible processing solutions to perform the task and to determine a task engine based at least in part on the processing estimate. The task engine comprises an analysis engine or a transaction engine. The analysis engine or the transaction engine is used to process the task. The processor is further to provide the task to the task engine.

20 Claims, 8 Drawing Sheets

US 10,423,644 B1

SPLITTING TRANSACTION AND ANALYSIS QUERIES

CROSS REFERENCE TO OTHER APPLICATIONS

This application claims priority to U.S. Provisional Patent Application No. 62/255,957 entitled SPLITTING TRANSACTION AND ANALYSIS QUERIES filed Nov. 16, 2015 which is incorporated herein by reference for all purposes.

BACKGROUND OF THE INVENTION

Relational Database Management Systems (RDBMS's) face the challenge of handling both transactional (On Line Transaction Processing—OLTP) and analytical (On Line Analytical Processing—OLAP) workloads. Classic RDBMS do this with specialized hardware that does not scale well or affordably as data volumes grow.

A different paradigm exists, the "shared-nothing" architecture, which typically networks commodity hardware together to allow for solving problems requiring large amounts of data in an affordable, scalable manner.

Existing shared-nothing database solutions typically specialize in OLAP-only or OLTP-only problems. This is due primarily to the fact that the two classes of problems require different approaches in order to succeed. OLTP workloads usually involve many fast "transactions"—either queries or updates that return or modify a very small number of rows. As the "transaction" word implies, these activities need to adhere to a transactional model under concurrency: consistent results, durably stored in case of hardware failure. OLAP workloads are typically not transactional at all but instead involve queries and joins for many (possibly) millions of rows of data or more. Here durability is less important than the speed of result generation—the faster the OLAP query runs, the better. However, a neither of these systems is able to handle both problems in a scale-out shared nothing architecture.

BRIEF DESCRIPTION OF THE DRAWINGS

Various embodiments of the invention are disclosed in the following detailed description and the accompanying drawings.

DETAILED DESCRIPTION

Figure 1:
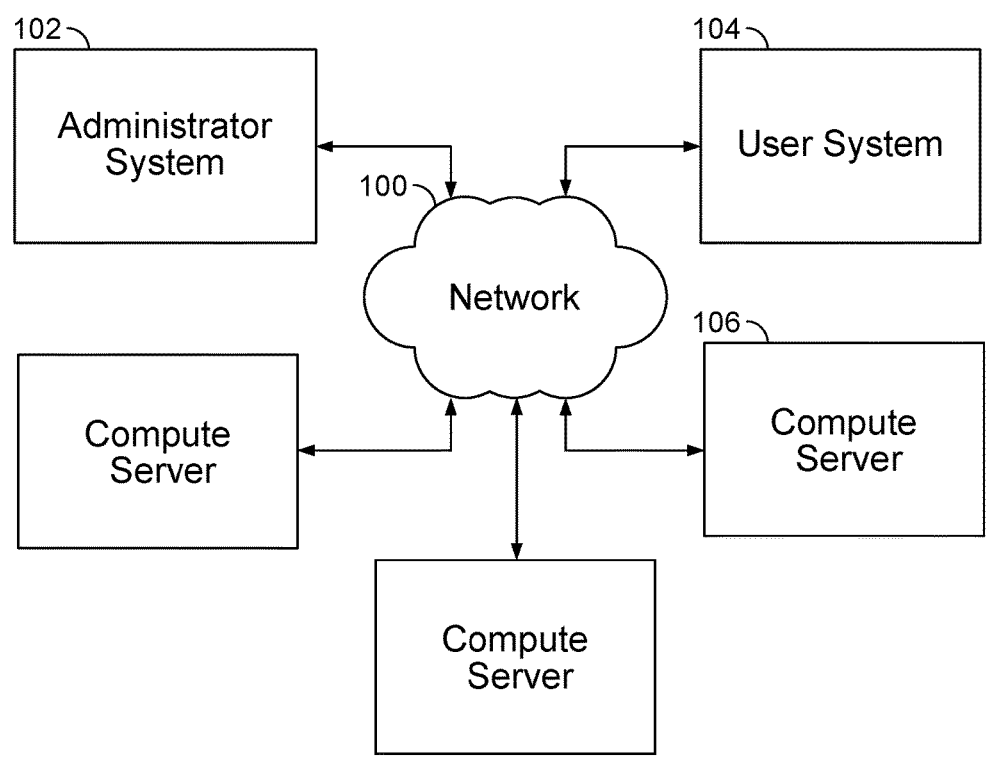
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for analysis and transaction processing comprises an interface configured to receive a task, and a processor configured to determine a processing estimate associated with the task by determining required resources for a set of possible processing solutions to perform the task, determine a task engine based at least in part on the processing estimate wherein the task engine comprises an analysis engine or a transaction engine and wherein the analysis engine or the transaction engine is used to process the task, and provide the task to the task engine. In some embodiments, the system for analysis and transaction processing additionally comprises a memory coupled to the processor and configured to provide the processor with instructions.

In some embodiments, the design of a new method for solving both database workloads (OLTP and OLAP) simultaneously within a shared-nothing architecture is disclosed. Two compute engines are embedded within the architecture, each working against the same data source, but also each dedicated to, and specialized in performing, OLAP or OLTP tasks.

In some embodiments, the overall flow includes a structured query language (SQL) request (e.g., code describing processing to perform a task that include, for example, a select, insert, update, create, or delete statement, etc.) being passed to an instance of the solution processor running on a compute server (which can be part of a cluster of compute servers). The instance processor generates an Execution Plan which defines the steps needed to accomplish the request. The Execution Plan is passed to the Decider, which determines whether the request is more suitable for an OLAP or an OLTP Workload Engine, and routes the Plan accordingly for execution.

In some embodiments, The OLTP Workload Engine handles those requests involving few rows of data, and typically should be completed in milliseconds. These requests are quickly processed, returning results, or updating records as necessary.

In some embodiments, the OLAP Workload Engine handles those requests involving many rows of data, where the request may take seconds, minutes, or longer. In order to facilitate efficient performance, the OLAP Workload Engine will partition the work into decomposable pieces, caching into memory where possible. Both workload engines access the persistent storage in a transactionally consistent manner. The OLAP Workload Engine knows to access the cache of the OLTP engine if needed for recent updates. For example, at the time of using data, scanning the cache of the OLTP engine to see if a given piece of data has been updated is performed; and in the event that the data has been updated, use that updated data for the processing within the OLAP Workload Engine.

FIG. 1 is a block diagram illustrating an embodiment of a network system. In some embodiments, the network system of FIG. 1 includes a system for splitting transaction and analysis queries. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, user system 104, and one or more compute servers (e.g., compute server 106) communicate via network 100. In various embodiments, administrator system 102 comprises a system for an administrator to access data on a compute server, to store data on a compute server, to delete data from a compute server, to perform computations using a compute server, to perform database operations using a compute server, or for any other appropriate purpose. User system 104 comprises a system for a user. In some embodiments, user system 104 comprises a system for accessing a compute server. Compute server 106 comprises a system for performing computations. In various embodiments, compute server 106 comprises a system for performing database operations, for storing data, for analyzing data, for performing transactional operations, or for any other appropriate purpose. In various embodiments, the network system of FIG. 1 comprises 1, 2, 3, 5, 9, 12, 22, 122, 173, 245, or any other appropriate number of compute servers. In some embodiments, compute servers are implemented using cloud computing hardware. In some embodiments, compute servers can be added to or removed from the network system.

Figure 2:
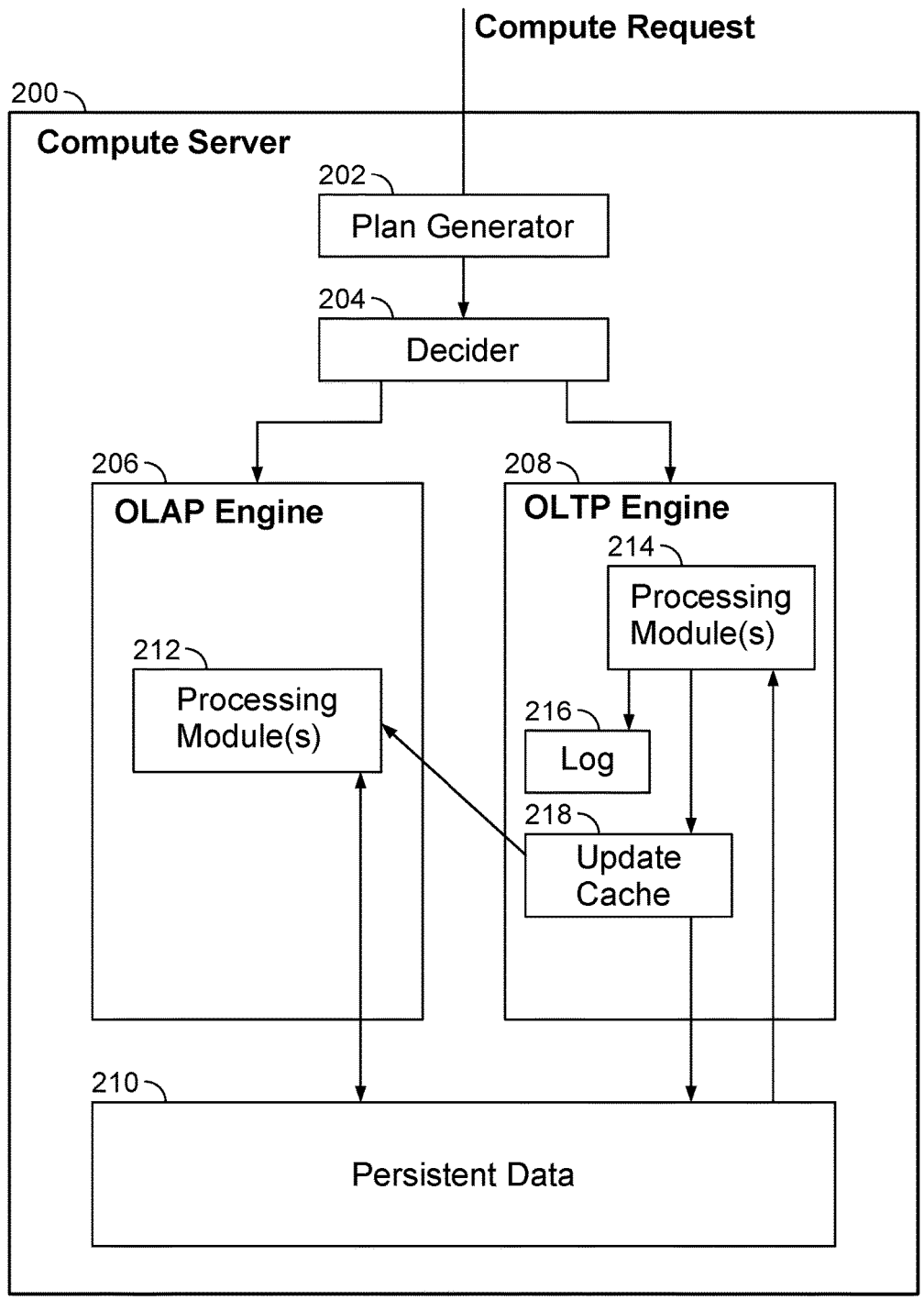
FIG. 2 is a block diagram illustrating an embodiment of a compute server.

FIG. 2 is a block diagram illustrating an embodiment of a compute server. In some embodiments, compute server 200 comprises compute server 106 of FIG. 1. In the example shown, compute server 200 receives a compute request. In various embodiments, the compute request comprises a request in code, a database code request, a SQL code request. In various embodiments, compute server 200 receives a compute request from a user system, from an administrator system, from another compute system, or from any other appropriate system. The compute request is received by plan generator 202. In some embodiments, plan generator 202 comprises a system for receiving a compute request and generating a set of processing solutions (e.g., compute plans) for executing the compute request. In various embodiments, processing solutions generated by plan generator 202 comprise a set of different step orders (e.g., a plurality of different table join order), a set of different algorithms (e.g., a plurality of different join algorithms), a set of different search strategy (e.g., searching using an index search and searching using a brute force search, etc.), or any other appropriate different solutions. In various embodiments, determining a processing solution comprises selecting a join type of a plurality of join types, selecting a scan type of a plurality of scan types, selecting a sort type of a plurality of sort types, selecting a step ordering, or determining a processing solution in any other appropriate way. Plan generator 202 comprises a system for determining a processing estimate for each processing solution of the set of processing solutions. In various embodiments, the processing estimate comprises a cost estimate, a processing time estimate, a network access cost estimate, a network access time estimate, a table size estimate, a memory usage estimate, or any other appropriate processing estimate. In some embodiments, the cost is determined by the formula:

$$\text{Cost} = \text{sum}[P_{time} + NA_{time} + MA_{time}],$$

where $P_{time}$ is an estimated processing time, $NA_{time}$ is an estimated network access time, and $MA_{time}$ is an estimated memory access time. In some embodiments, time estimates are weighted before summing for the cost estimate. In some embodiments, a factor included in the cost function comprises a lowering of the cost for using a prior option selection (e.g., a weighted factor for reducing cost, a subtracted factor for cost summation, etc.). In some embodiments, network and memory access time are measured dynamically to reflect current network and system status. In various embodiments, processing time cost estimates are based on one or more of the following: (a) the number of rows required to be processed (b) the operations to be performed (e.g., joins, aggregations, etc), (c) the nature of the table to be processed (e.g., main table or index table), and (d) the number of columns to be processed. In some embodiments, the current load (e.g., CPU, network, etc.) on the server influences one operation type over another and score the costs accordingly. For example, one particular join strategy will fare better than another under high load, whereas the opposite would be true for a lower load.

In some embodiments, a processing estimate is determined for a processing solution by determining required resources for the processing solution. In various embodiments, required resources comprise required time resources, required memory resources, or any other appropriate resources. Plan generator 202 additionally comprises a system for selecting a processing solution of the set of processing solutions. In some embodiments, the processing solution with the smallest processing estimate is selected. Decider 204 comprises a decider for determining whether to process a received compute request using OLAP engine 206 or OLTP engine 208. In some embodiments, decider 204 determines to process a received compute request using OLTP engine 208 in the event the processing estimate is below an OLTP threshold (e.g., requests consuming fewer resources are processed using OLTP engine 208 and requests consuming more resources are processed using OLAP engine 206). In some embodiments, decider 204 determines to process a received compute request using OLAP engine 206 in the event that a cost associated with the compute request exceeds a cost threshold (e.g., a cost associated with resources consumed—for example, processing time, memory resource usage, memory access time, network traffic time, etc.). In some embodiments, decider 204 determines to process a received compute request using OLTP engine 208 in the event that a cost associated with the compute request is below a cost threshold. In some embodiments, decider 204 determines whether to process a received compute request using OLAP engine 206 or OLTP engine 208 based at least in part on the current load on OLTP engine 208 and/or OLAP engine 206. In some embodiments, if plan cost is below threshold X, but load on OLTP engine 208>Y and load on OLAP engine 206<Z, select OLAP engine 206 instead of OLTP engine 208. In some embodiments, decider 204 determines whether to process a received compute request using OLAP engine 206 or OLTP engine 208 based at least in part on a cache value—for example, if OLAP engine 206 cached a previous calculation that a given plan can use, decider 204 selects OLAP engine 206, or if OLTP engine 208 cached a previous calculation that the given plan can use, decider 204 selects OLTP engine 208. In some embodiments, a decider determines the selection based simply on an estimated row count returned. For example, if very few rows, the OLTP engine is preferred. In some embodiments, a decider incorporates overall plan complexity (e.g., a number of steps in the plan)—since the OLAP engine can better process multiple steps (including caching of intermediate results), the OLAP engine is selected to process plans with a number of steps greater than a threshold number of steps.

In some embodiments, OLAP engine 206 comprises a request processing engine structured to handle larger processing requests. In some embodiments, OLAP engine 206 comprises a request processing engine designed to handle database requests involving many rows of data efficiently, where the request may take seconds, minutes, or longer. In some embodiments, OLAP engine 206 partitions a compute request into decomposable pieces, caching into memory where possible. OLAP engine 206 comprises processing module(s) 212, comprising a set of one or more processing modules for processing a compute request or portions of a compute request. In some embodiments, there are multiple processing modules, each processing module able to take a portion or a partition of a set of rows in order to enable parallel processing. In some embodiments, each processing module works with its partition or partitions of data, employing an in-memory cache for performance as available. In some embodiments, OLAP engine 206 comprises an engine built on top of Apache Spark™. OLAP engine 206 accesses persistent storage 210 in a transactionally consistent manner. In some embodiments, OLAP engine 206 requests cached data from OLTP engine 208 (e.g., from update cache 218) in the event the cached data is needed to complete a processing request.

In some embodiments, OLTP engine 208 comprises a request processing engine structured to handle smaller processing requests. In some embodiments, OLTP engine 208 processes requests where it is expected that each step of the processing request plan is short-lived and will be processed quickly and durably, through transactionally consistent application programming interface (API) primitive operations of OLTP engine 208. In some embodiments, modifications are written durably to log 216 to allow for failure recovery and stored in update cache 218 to improve performance. Modifications are eventually flushed to a persistent storage (e.g., persistent data 210). In some embodiments, OLTP engine 208 comprises a durable transactional engine based on Apache HBase™. In some embodiments, OLTP engine 208 processes transactions in an ACID manner (e.g., Atomicity, Consistency, Isolation, and Durability). In some embodiments, OLTP engine 208 handles database processing requests involving a small number of rows of data (e.g., N rows—for example, a number of rows less than 1000) and that should be completed in milliseconds. Smaller processing requests are quickly processed by OLTP engine 208, returning results or updating records as necessary.

In some embodiments, OLTP engine 208 comprises processing module(s) 214, comprising a set of one or more processing modules for processing a compute request or portions of a compute request. OLTP engine 208 comprises an update cache 218 for storing update data (e.g., transaction results) that have not yet been committed to persistent data 210. Persistent data 210 comprises a persistent data storage for storing compute server data. In some embodiments, persistent data 210 comprises a data storage for storing database data. In some embodiments, persistent data 210 is accessible to both OLAP engine 206 and OLTP engine 208. In some embodiments, when OLAP engine 206 requires data with a transactional context (e.g., data likely to be involved in a transaction processed by OLTP engine 208), OLAP engine 206 retrieves the data from persistent data 210 then checks update cache 218 for any applicable updates to the data. If applicable updates are found in update cache 218, OLAP engine 206 merges them into the retrieved data prior to any processing steps (e.g., by checking which location has data that was updated most recently). In some embodiments, persistent data 210 is implemented using Hadoop Distributed File System (e.g., HDFS). In some embodiments, each element of compute server 200 is implemented using a processor. In various embodiments, the elements of compute server 200 are each implemented using separate processors, are all implemented using a single processor, or are implemented using multiple processors in any other appropriate way.

In some embodiments, the architecture of compute server 200 supports multiple levels of resource management between engines. OLAP engine 206 and OLTP engine 208 can be individually prioritized using prioritization mechanisms of compute server 200 (e.g., Linux cgroups). Within OLAP engine 206, since tasks can be long running, a facility exists to manage its priority of resources. Individual tasks are assigned to pools for access to the resources assigned to those pools. Task prioritization mechanisms are created and customized based upon the nature of the task, customers, etc. Resource scheduling in each pool can use multiple types of algorithms, for example first-in-first-out. In some embodiments, OLTP engine 208 does not need sophisticated resource management given the nature of its workload. In some embodiments, OLTP engine 208 processes individual requests in milliseconds.

Figure 3:
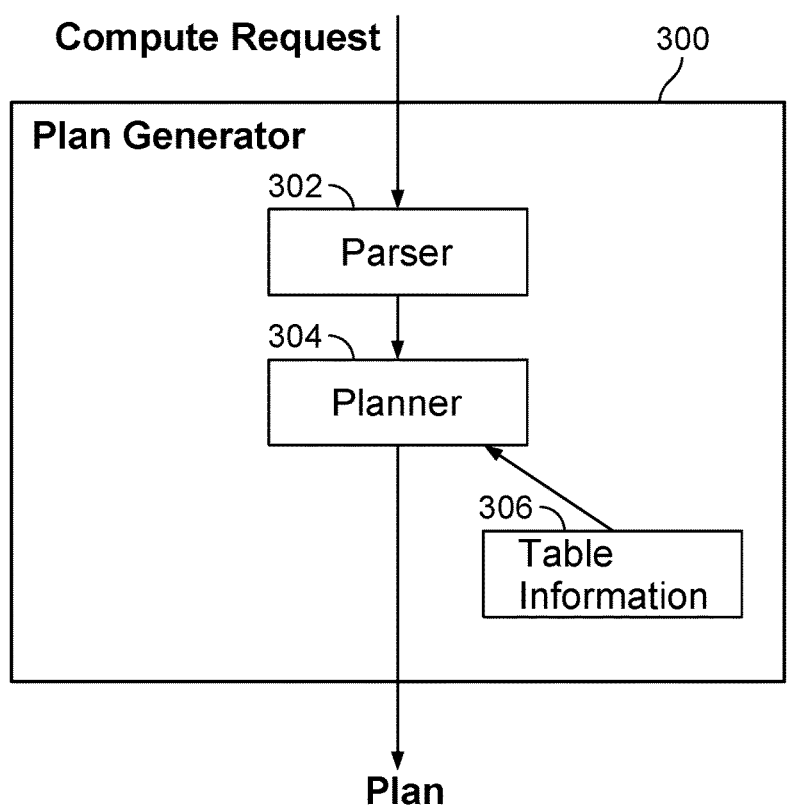
FIG. 3 is a block diagram illustrating an embodiment of a plan generator.

FIG. 3 is a block diagram illustrating an embodiment of a plan generator. In some embodiments, plan generator 300 comprises plan generator 202 of FIG. 2. In the example shown, plan generator 300 comprises parser 302, planner 304, and table information 306. Parser 302 comprises a parser for parsing a compute request. In some embodiments, a compute request comprises a task. In some embodiments, parser 302 comprises a parser for parsing a request instantiated as code (e.g., an SQL compute request). In various embodiments, parsing a compute request comprises determining a set of operations requested by the compute request, determining a set of data accessed by the compute request, determining network connections required by the compute request, or determining any other appropriate aspect of the compute request. Planner 304 receives compute request data from parser 302. In some embodiments, planner 304 determines a set of possible processing solutions for executing the compute request. In some embodiments, planner 304 determines all possible processing solutions for executing the request. In some embodiments, a processing solution comprises an order of operations, a set of algorithm type determinations (e.g., a join type, a scan type, a sort type, etc.), a set of network connections, etc. In some embodiments, planner 304 uses information from table information 306 for determining processing solutions. In some embodiments, planner 304 collects information about the table or tables involved in the compute request, and considers options available to execute the request quickly (e.g., data filtering, table sizes, index availability). In various embodiments, table information stored in table information 306 comprises table index information (e.g., an index of stored tables), table type information, table size information, table density information, table usage information, or any other appropriate table information. In various embodiments, table information includes one or more of the following: total row count, total partition count, average row size, average partition size, or any other appropriate information. In various embodiments, information in a table column includes one or more of the following: cardinality, minimum value, maximum value, top k values, null count, or any other appropriate information. In some embodiments, planner 304 additionally determines required resources associated with each processing solution of the set of processing solutions. In various embodiments, required resources comprise required time resources, required memory resources, required processor resources, required network resources, required table resources, or any other appropriate required resources. Planner 304 additionally determines a processing estimate associated with the task. In some embodiments, determining a processing estimate associated with the task comprises selecting a processing solution of the set of processing solutions. In some embodiments, the selected processing solution comprises the processing solution of the set of processing solutions comprising the least required resources. In various embodiments, a processing estimate comprises a cost estimate, a time estimate, a network access cost estimate, a network access time estimate, a table size estimate, a memory usage estimate, or any other appropriate estimate. Planner 304 provides the selected processing solution and the processing estimate.

In some embodiments, a compute request is received—for example:

```
SQL Query:
    select a.k, b.l, c.m from a,b,c
        where a.i = b.i and b.i = c.i
        Possible plans:
            Option 1:
                1. Scan a
                2. Scan b
                3. Join a/b using NestedLoop strategy
                4. Join result of a/b with c using NestedLoop strategy
            Option 2:
                1. Scan b
                2. Scan a
                3. Join b/a using Broadcast strategy
                4. Join result of b/a with c using Broadcast strategy
            Option 3:
                1. Scan c - using available index
                2. Scan b
                3. Join c/b using SortMerge strategy
                4. Join result of a/b with c using SortMerge strategy
```

In some embodiments, possible plans include some or all permutations of scan order (e.g., Table order: (a/b/c), (b/a/c), etc.), join strategy, join order, search type (e.g., scan, index search, etc.), and any other appropriate plan possibility options.

Example costs from solutions above—note—read order of execution from BOTTOM to TOP in each example. In the examples below, TC is the total cost of the processing for the option, OR is the output rows of processing the option, and OHP is the output heap size of processing the option. Note that the TC for option 1 is lower than option 2 or option 3. In the event that the lowest cost option is selected, then option 1 is selected as the processing option. In some embodiments, in the event that the cost is above a threshold, the processing option is designated to be processed using an OLAP engine.

```
Option 1:
Final Result (n=8,rows=10485760,updateMode=READ_ONLY (1),engine=Spark)
    -> (n=7, TC=44358969860.959, OR=10485760, OHP=480 MB, partitions=1)
        -> (n=6, TC=44341648964.134, OR=10485760, OHP=480 MB, partitions=1)
            -> NestedLoopJoin(n=5, TC=44341648964.134, OR=10485760, OHP=480 MB, partitions=1)
                -> TableScan[C(1568)](n=4, TC=51.514, OR=4096, OHP=480 MB, partitions=1, preds=[B.I[5:3] = C.I[6:1])])
                -> NestedLoopJoin(n=3, TC=21217.318, OR=2560, OHP=80 KB, partitions=1)
                    -> TableScan[B(1552)](n=2, TC=6.97, OR=256, OHP=80 KB, partitions=1, preds=[(A.I[1:1] = B.I[2:1])])
                    -> TableScan[A(1536)](n=1, TC=4.012, OR=10, OHP=160 B, partitions=1)
Option 2:
Final Result(n=8,rows=10485760,updateMode=READ_ONLY (1),engine=Spark)
    -> (n=7, TC=4577161.938, OR=10485760, OHP=161.25 MB, partitions=1)
        -> (n=6, TC=545.746, OR=10485760, OHP=161.25 MB, partitions=1)
            -> BroadcastJoin(n=5, TC=545.746, OR=10485760, OHP=161.25 MB, partitions=1, preds=[(B.I[8:1] = C.I[8:5])])
                -> TableScan[C(1568)](n=4, TC=51.514, OR=40960, OHP=161.25 MB, partitions=1)
                -> BroadcastJoin(n=3, TC=15.097, OR=2560, OHP=40.156 KB, partitions=1, preds=[(A.I[4:3] = B.I[4:1])])
                    -> TableScan[A(1536)](n=2, TC=4.012, OR=10, OHP=40.156 KB, partitions=1)
                    -> TableScan[B(1552)](n=1, TC=6.97, OR=2560, OHP=40 KB, partitions=1)
Option 3:
Final Result (n=9,rows=10485760,updateMode=READ_ONLY (1),engine=Spark)
    -> (n=8, TC 4812161.217, OR=10485760, OHP=160.039 MB, partitions=16)
        -> (n=7, TC=235545.025, OR=10485760, OHP=160.039 MB, partitions=16)
            -> MergeSortJoin(n=6, TC=235545.025, OR=10485760, OHP=160.039 MB, partitions=16, preds=[(C.I[9:1] = A.I[9:5])])
                -> TableScan[A(1536)](n=5, TC=4.012, OR=10, OHP=160.039 MB, partitions=16)
                -> MergeSortJoin(n=4, TC=175682.807, OR=10485760, OHP=160.039 MB, partitions=16,
preds=[(B.I[5:3] = C.I[5:1])])
```

```
    -> TableScan[B(1552)](n=3, TC=6.97, OR=2560, OHP=160.039 MB, partitions=16)
    -> IndexLookup(n=2, TC=163893.562, OR=40960, OHP=640 KB, partitions=1)
      -> IndexScan[CI(1585)](n=1, TC=53.562, OR=40960, OHP=640 KB,
partitions=1,baseTable=C(1568))
```

Figure 4:
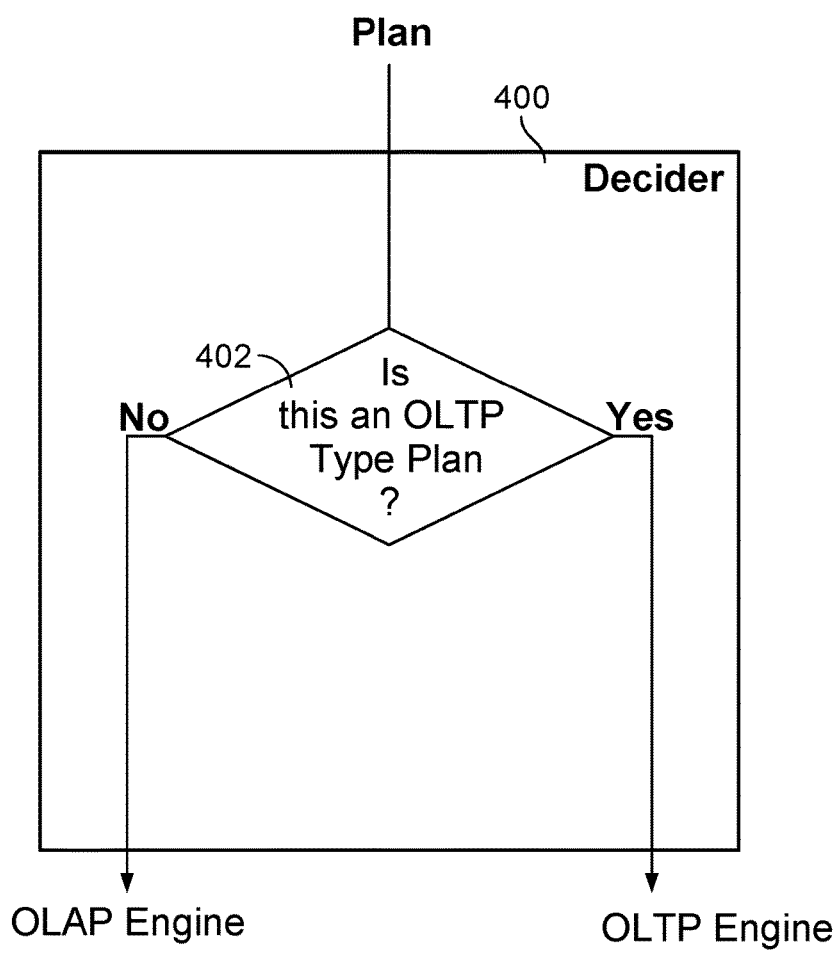
FIG. 4 is a block diagram illustrating an embodiment of a decider.

FIG. 4 is a block diagram illustrating an embodiment of a decider. In some embodiments, decider 400 comprises decider 204 of FIG. 2. In the example shown, decider 400 comprises engine decision 402. Engine decider 402 receives a plan and determines whether the plan is an OLTP type plan or an OLAP type plan. Engine decider 402 provides plan to either the OLTP Engine or OLAP Engine. In some embodiments, engine decision 402 receives a plan and decides whether the plan comprises an OLTP type plan. In some embodiments, the decision is based at least in part on a processing estimate (e.g., a processing estimate received from a plan generator). In some embodiments, engine decision 402 determines a plan comprises an OLTP type plan in the event the processing estimate is below a processing estimate threshold. In various embodiments, engine decision 402 determines an engine based at least in part on a processing estimate, on a number of rows processed, on a job importance, on a system availability, or on any other appropriate information. In some embodiments, engine decision 402 determines a plan does not comprise an OLTP type plan (e.g., the plan comprises an OLAP type plan) in the event the processing estimate is above a processing estimate threshold.

Figure 5:
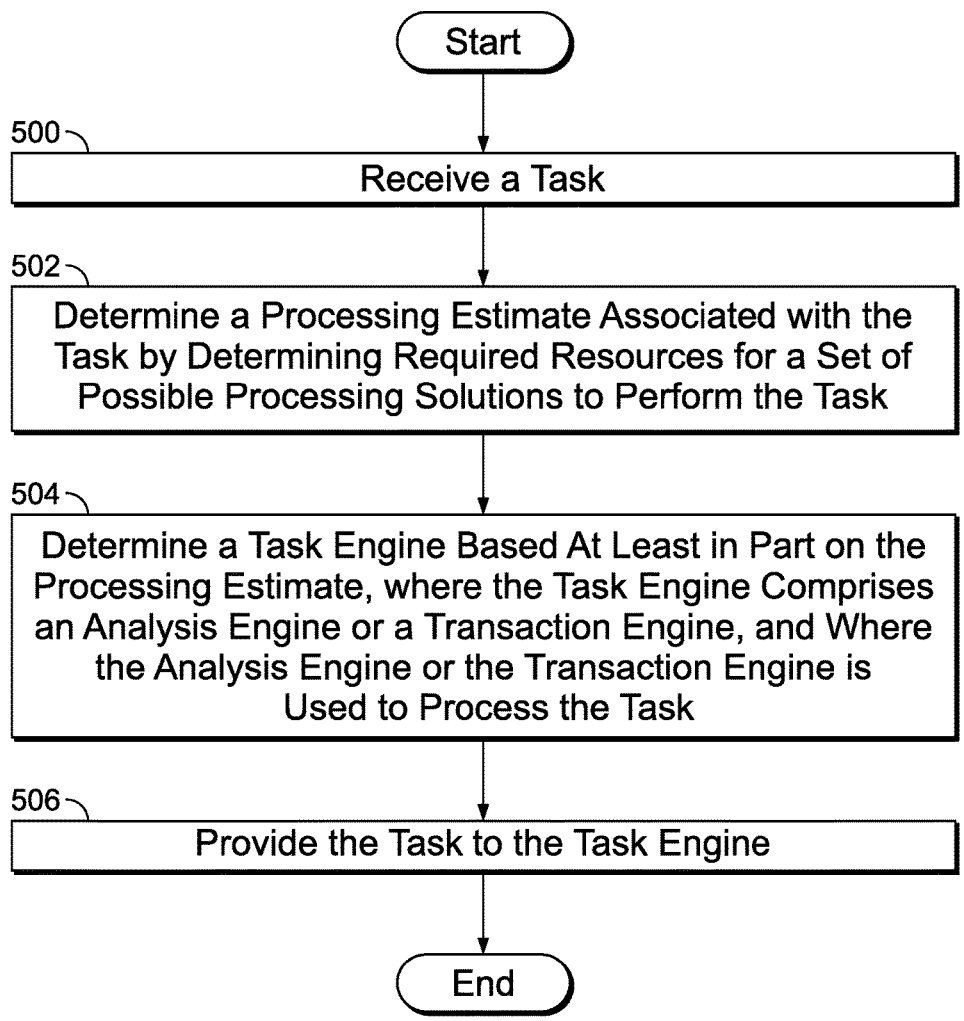
FIG. 5 is a flow diagram illustrating an embodiment of a process for splitting transaction and analysis queries.

FIG. 5 is a flow diagram illustrating an embodiment of a process for splitting transaction and analysis queries. In some embodiments, the process of FIG. 5 is executed by compute server 200 of FIG. 2. In the example shown, in 500, a task is received. In some embodiments, the task comprises a compute request. In some embodiments, the task comprises SQL code. In 502, a processing estimate is determined associated with the task by determining required resources for a set of possible processing solutions to perform the task. In some embodiments, determining a processing estimate additionally comprises determining the set of possible processing solutions to perform the task. In some embodiments, the processing estimate comprises the required resources for the processing solution requiring the fewest resources. In 504, a task engine is determined based at least in part on the processing estimate, wherein the task engine comprises an analysis engine or a transaction engine, and wherein the analysis engine or the transaction engine is used to process the task. In some embodiments, determining a task engine comprises comparing the processing estimate with a threshold. In 506, the task is provided to the task engine. In some embodiments, the processing solution to perform the task (e.g., the processing solution to perform the task determined in 500, a processing hint, a preferred processing option, a prior selected processing option, etc.) is additionally provided to the task engine.

Figure 6:
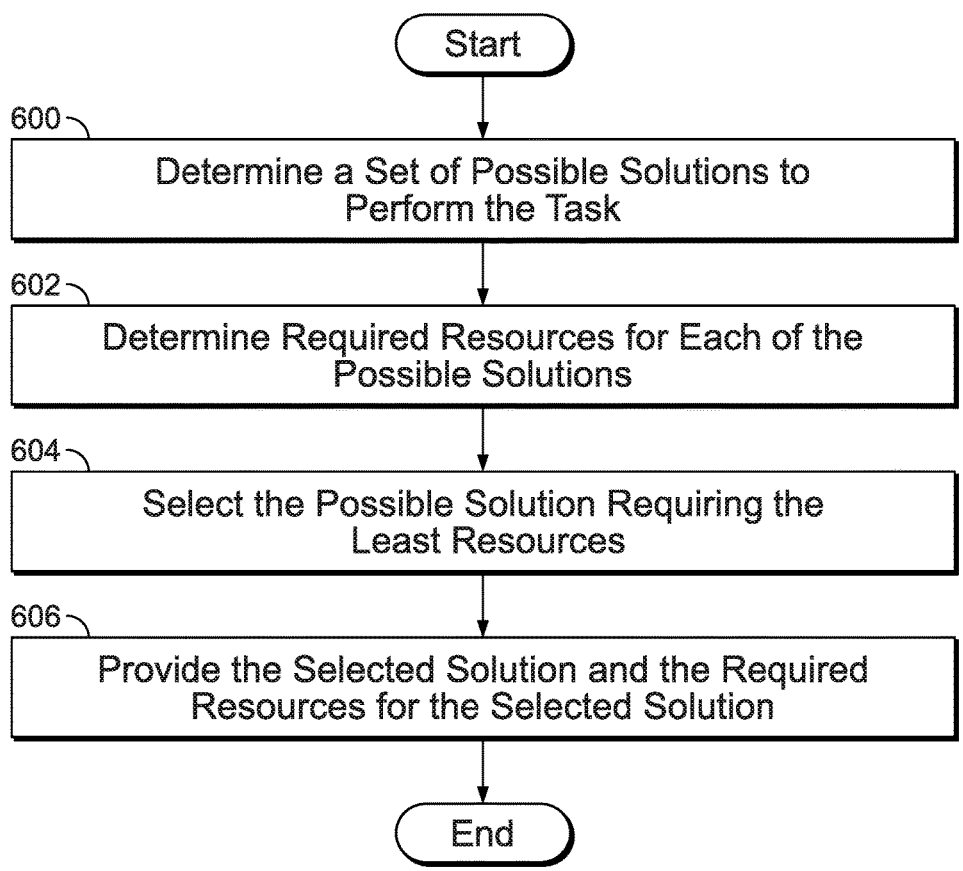
FIG. 6 is a flow diagram illustrating an embodiment of a process for determining a processing estimate associated with a task.

FIG. 6 is a flow diagram illustrating an embodiment of a process for determining a processing estimate associated with a task. In some embodiments, the process of FIG. 6 implements 502 of FIG. 5. In the example shown, in 600, a set of possible solutions to perform the task is determined. In various embodiments, determining a set of possible solutions to perform a task comprises determining a set of possible subtask orders, determining a set of possible join types, determining a set of possible scan types, determining a set of possible sort types, or determining any other appropriate set of solution options. In some embodiments, determining a set of possible solutions to perform a task comprises a determining a set of combinations of solution options. In some embodiments, a possible processing solution of the set of possible processing solutions comprises a join type of a plurality of possible join types. In some embodiments, a possible processing solution of the set of possible processing solutions comprises a scan type of a plurality of possible scan types. In various embodiments, a scan type comprises an index search scan type, a brute force search scan type, or any other appropriate scan type. In some embodiments, a set of combinations of solution options comprises all appropriate combinations of solution options. In 602, required resources for each of the possible solutions are determined. In 604, the possible solution (e.g., of the set of possible solutions) requiring the least resources is selected. In 606, the selected solution and the required resources for the selected solution are provided.

Figure 7:
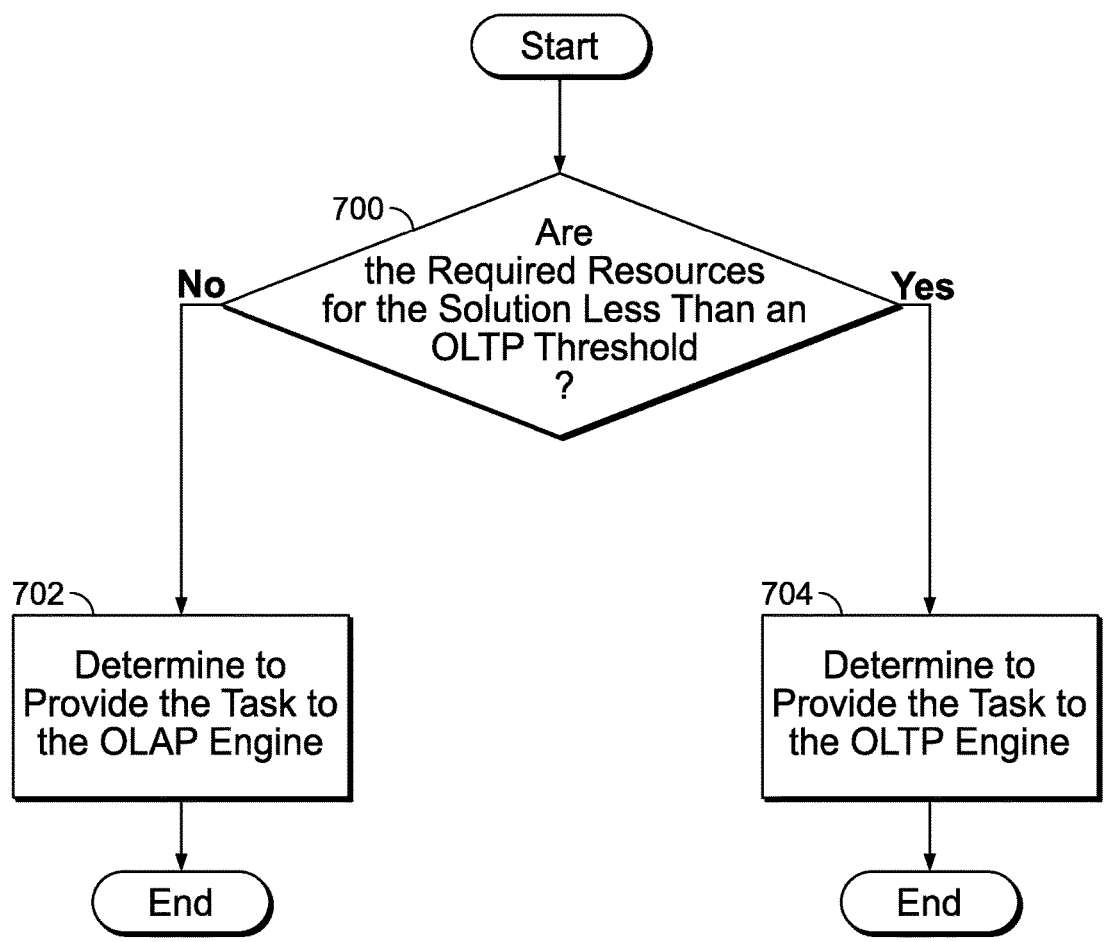
FIG. 7 is a flow diagram illustrating an embodiment of a process for determining a task engine.

FIG. 7 is a flow diagram illustrating an embodiment of a process for determining a task engine. In some embodiments, the process of FIG. 7 implements 504 of FIG. 5. In the example shown, in 700, it is determined whether the required resources for the solution are less than an OLTP threshold. In some embodiments, an OLTP threshold comprises a threshold dividing typical required resources for an OLTP task from typical required resources for an OLAP task. In the example shown, in the event it is determined that the required resources for the solution are not less than the OLTP threshold, control passes to 702. In 702, it is determined to provide the task to the OLAP engine, and the process ends. In the event it is determined in 700 that the required resources for the solution are less than an OLTP threshold, control passes to 704. In 704, it is determined to provide the task to the OLTP engine.

Figure 8:
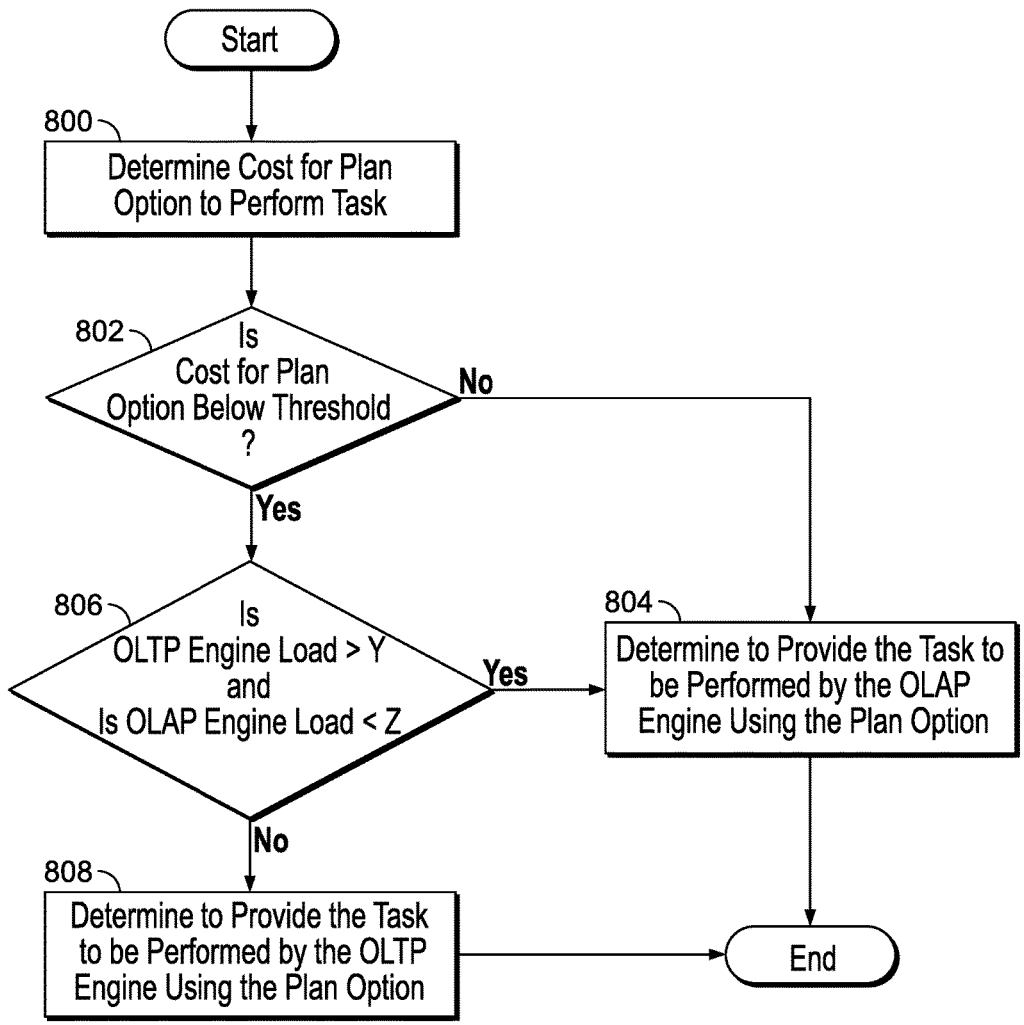
FIG. 8 is a flow diagram illustrating an embodiment of a process for determining a task engine.

FIG. 8 is a flow diagram illustrating an embodiment of a process for determining a task engine. In some embodiments, the process of FIG. 8 implements 504 of FIG. 5. In the example shown, in 800 a cost is determined for a plan option to perform a task. In 802, it is determined whether the cost for the plan option is below a threshold. In the event that the cost for the plan is not below the threshold, then in 804 it is determined to provide the task to be performed by the OLAP Engine using the plan option and the process ends. In the event that the cost for the plan is below the threshold, then in 806 it is determined whether the OLTP ENGINE load is greater than Y and the OLAP load is less than Z. In the event that the OLTP engine load is greater than Y and the OLAP Engine load is less than Z, then control passes to 804. In the event that that it is not determined that the OLTP engine load is greater than Y and the OLAP engine load is less than Z, then in 808 it is determined to provide the task to be performed by the OLTP Engine using the plan option and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for analysis and transaction processing, comprising:
    an interface configured to receive a task; and
    a processor configured to:
        determine a processing estimate associated with the task by determining required resources for a set of possible processing solutions to perform the task;
        determine a task engine based at least in part on the processing estimate, wherein the task engine comprises an analysis engine or a transaction engine, and wherein the analysis engine or the transaction engine is used to process the task, wherein the determining of the task engine comprises to:
            determine whether the processing estimate exceeds a cost threshold; and
            in response to a determination that the processing estimate does not exceed the cost threshold:
                determine whether a load of the transaction engine is greater than a first threshold and a load of the analysis engine is less than a second threshold; and
                in response to a determination that the load of the transaction engine is greater than the first threshold and the load of the analysis engine is less than the second threshold, determine to provide the task to the analysis engine; and
        provide the task to the task engine.

2. The system of claim 1, wherein the task comprises a request in code.

3. The system of claim 1, wherein the processing estimate comprises a cost estimate.

4. The system of claim 1, wherein the processing estimate comprises a time estimate.

5. The system of claim 1, wherein the processing estimate comprises a network access cost estimate.

6. The system of claim 1, wherein the processing estimate comprises a network access time estimate.

7. The system of claim 1, wherein the processing estimate comprises a table size estimate.

8. The system of claim 1, wherein the processing estimate comprises a memory usage estimate.

9. The system of claim 1, wherein the required resources comprise required time resources.

10. The system of claim 1, wherein the required resources comprise required memory resources.

11. The system of claim 1, wherein a possible processing solution of the set of possible processing solutions comprises a join type of a plurality of possible join types.

12. The system of claim 1, wherein a possible processing solution of the set of possible processing solutions comprises a scan type of a plurality of scan types.

13. The system of claim 12, wherein the scan type comprises an index search.

14. The system of claim 12, wherein the scan type comprises a brute force search.

15. The system of claim 1, wherein determining a processing estimate associated with the task additionally comprises selecting a processing solution of the set of possible processing solutions.

16. The system of claim 15, wherein selecting a processing solution of the set of possible processing solutions comprises selecting the processing solution requiring the least resources.

17. The system of claim 1, wherein providing the task to the task engine additionally comprises providing a selected processing solution of the set of possible processing solutions to the task engine.

18. The system of claim 1, wherein determining a task engine based at least in part on the processing estimate comprises comparing the processing estimate with a threshold.

19. A method for analysis and transaction processing, comprising:
    receiving a task;
    determining, using a processor, a processing estimate associated with the task by determining required resources for a set of possible processing solutions to perform the task;
    determining a task engine based at least in part on the processing estimate wherein the task engine comprises an analysis engine or a transaction engine, and wherein the analysis engine or the transaction engine is used to process the task, wherein the determining of the task engine comprises:
        determining whether the processing estimate exceeds a cost threshold; and
        in response to a determination that the processing estimate does not exceed the cost threshold:
            determining whether a load of the transaction engine is greater than a first threshold and a load of the analysis engine is less than a second threshold; and
            in response to a determination that the load of the transaction engine is greater than the first threshold and the load of the analysis engine is less than the second threshold, determining to provide the task to the analysis engine; and
    providing the task to the task engine.

20. A computer program product for analysis and transaction processing, the computer program product being embodied in a non-transitory computer readable storage medium and comprising computer instructions for:
    receiving a task;
    determining a processing estimate associated with the task by determining required resources for a set of possible processing solutions to perform the task;
    determining a task engine based at least in part on the processing estimate wherein the task engine comprises an analysis engine or a transaction engine, and wherein the analysis engine or the transaction engine is used to process the task, wherein the determining of the task engine comprises:
        determining whether the processing estimate exceeds a cost threshold; and
        in response to a determination that the processing estimate does not exceed the cost threshold:
            determining whether a load of the transaction engine is greater than a first threshold and a load of the analysis engine is less than a second threshold; and
            in response to a determination that the load of the transaction engine is greater than the first threshold and the load of the analysis engine is less than the second threshold, determining to provide the task to the analysis engine; and
    providing the task to the task engine.

* * * * *